United States Patent [19]
Horvath

[11] 3,732,688
[45] May 15, 1973

[54] CONNECTING LINKS

[76] Inventor: Tibor Horvath, 944 Avenue R, Brooklyn, N.Y. 11233

[22] Filed: Feb. 22, 1971

[21] Appl. No.: 117,564

[52] U.S. Cl. ................................................. 59/85
[51] Int. Cl. ............................................. F16g 15/04
[58] Field of Search ........................... 59/85, 86, 93

[56] References Cited

UNITED STATES PATENTS

| 3,603,078 | 9/1971 | Schwiebert | 59/85 |
| 547,642 | 10/1895 | King | 59/86 |
| 418,812 | 1/1890 | McIntire | 59/85 |
| 2,837,890 | 6/1958 | Morrill | 59/86 |

Primary Examiner—Charles W. Lanham
Assistant Examiner—Gene P. Crosby
Attorney—Peter L. Tailer

[57] ABSTRACT

Identical, mating connecting links for chain each have a curved shank having ends terminating in an inwardly extending pintle and a plate containing a pintle receiving aperture. Each pintle has a lug formed on its inner end and each aperture has a keyway opening to receive a lug therethrough. The pintle of each link is driven through the plate aperture of the other link when the links are in a maximum folded position. When the lugs pass through the keyway apertures, the links are foldably connected with the inner end of the pintles butting each other and the lugs preventing inward sliding of the plates along the pintles.

6 Claims, 8 Drawing Figures

PATENTED MAY 15 1973 3,732,688
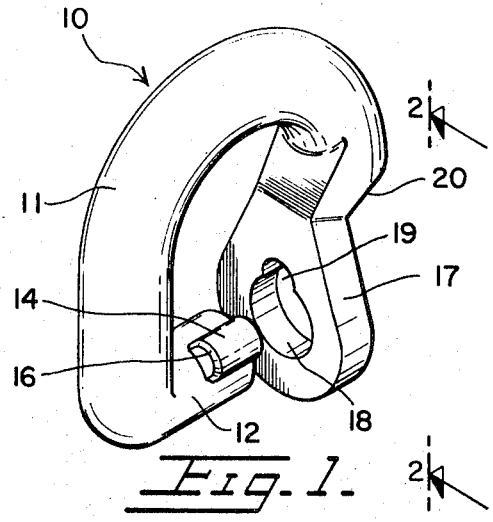
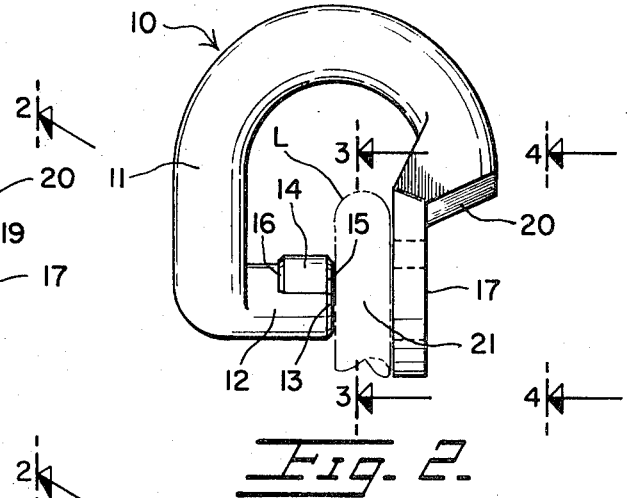
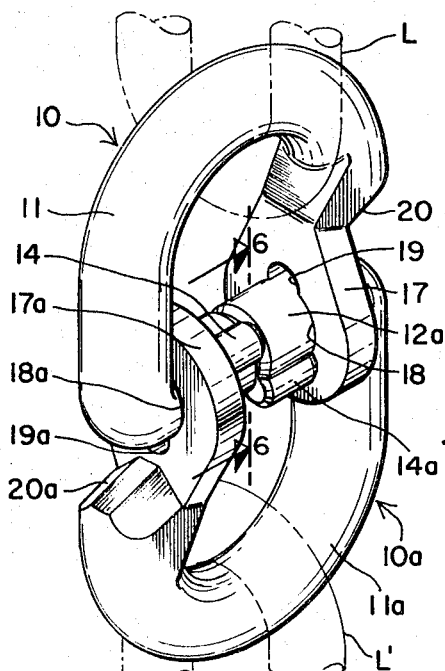
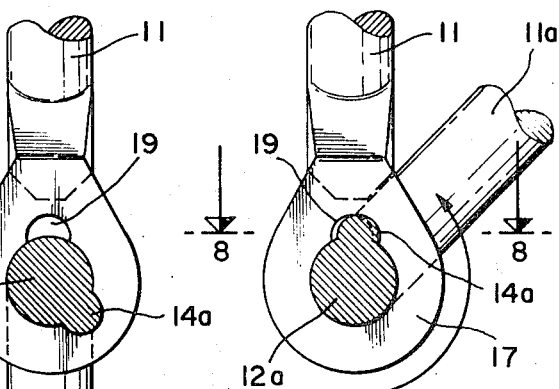
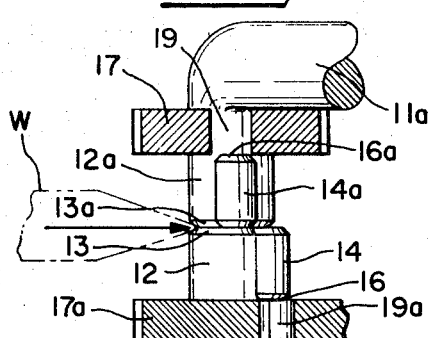
INVENTOR.
TIBOR HORVATH
BY Peter S. Tailer
ATTORNEY

CONNECTING LINKS

BACKGROUND OF THE INVENTION

There is a need for chain connecting links for joining chain ends, for fixing an anchor to a chain length, or the like. The links of this invention are easy to use, are less expensive to manufacture, and are stronger than comparable links.

BRIEF DESCRIPTION OF THE DRAWING

FIG. 1 is a perspective view of a link according to my invention;

FIG. 2 is a front view of a link showing a chain end link in phantom lines being hooked thereon;

FIG. 3 is a section taken on line 3—3 of FIG. 2;

FIG. 4 is a side view of a fragment of a link taken on line 4—4 of FIG. 2;

FIG. 5 is a perspective view of two links joined together with end links of chain shown in phantom lines hooked thereto;

FIG 6 is a section taken on line 6—6 of FIG. 5;

FIG. 7 is a section taken through the pintle of one link showing fragments of two links folded into position for assembly or disassembly; and FIG. 8 is a section taken on line 8—8 of FIG. 7 showing a wedge in phantom lines being used to disassemble two links.

DESCRIPTION OF THE PREFERRED EMBODIMENT

As shown in FIGS. 1-8, each link 10 has a curved shank 11 terminating in an inward extending pintle 12 with a beveled inner end 13. A lug 14 is formed on the inner end of pintle 12. The inner and outer ends of lug 14 have the bevels 15 and 16 formed thereon. The other end of each shank 11 terminates in a plate 17 containing an opening 18 to receive a pintle 12a of another link 10a. A keyway opening 19 is formed at one edge of opening 18. A portion of shank 11 forms a shoulder 20 adjacent to and outside of plate 17. Identical links 10 and 10a are formed, the link 10a having all the elements described above for the link 10 and designated by the same reference numerals followed by the character a.

As shown in FIG. 5, the identical links 10 and 10a are assembled in the following manner. End links L and L' of two chains are passed through the gap 21, as shown in FIG. 2, and hooked on the links 10 and 10a. It is to be noted that the size of gap 21 limits the size of the chain links L which may fit therethrough so that given connecting links 10 and 10a may not be used to join too large and strong a chain. The links 10 and 10a are folded in one direction as shown in FIG. 7 so that the lugs 14 and 14a and the keyway openings 19 and 19a are aligned as the pintles 12 and 12a enter the openings 18 and 18a.

As further shown in FIG. 7, as the pintles 12 and 12a slide into the openings 18 and 18a the shanks 11 and 11a will contact the shoulders 20 and 20a to jam the further assembly of the links. A sharp blow with a hammer will force the links 10 and 10a together to complete assembly so that they may be unfolded into the position shown in FIG. 5. The lugs 14 and 14a now position the plates 17 and 17a on the pintles 12 and 12a while the inner ends 13 and 13a of the pintles butt against each other. Great strain on the assembled links sufficient to even deform the shanks 11 and 11a forces the ends 13 and 13a together to resist the deformation.

As shown in FIG. 8, the links 10 and 10a in the folded position will not fall apart as the shoulders 20 prevent the exact alignment of the lugs 14 and 14a with the keyway openings 19 and 19a. However, the bevels 16 and 16a enter the keyway openings 19 and 19a so that a wedge W may be driven between the beveled ends 13 and 13a of the pintles to spring the links 10 and 10a apart. The beveled ends 13 and 13a allow the easy insertion of the pintles 12 and 12a into the openings 18 and 18a and they also allow the wedge W to be easily driven between the ends 13 and 13a to disassemble the links. Bevels 16 and 16a on the lugs 14 and 14a are required to disassemble the links as, without these bevels, they could not be sprung apart.

Thus it may be soon that this invention provides stronger connecting links which are easier to use and less expensive to manufacture as only two identical elements need be provided.

What is claimed is:

1. Identical, mating connecting links for chain or the like comprising, in combination, two links each having a bent shank having two ends, one end terminating in an inward extending pintle and the other end terminating in a plate containing an opening aligned with said pintle, said pintle having an inner end and having a lug formed on said inner end, said plate containing a keyway opening at the edge of said opening therein, said links being assembled by positioning and folding said links to insert the pintle of each link into the opening of the other link while passing said lugs through said keyway openings, the unfolding of said assembled links moving said lugs behind said plates away from said keyway openings securing said plates on said pintles, said pintles having inner ends which butt against each other when said links are assembled, each of said shanks forming a shoulder disposed outside and above the opening in each of said plates, each of said shoulders limiting the folding said links on contact with the shank of the other link, said lugs and said keyway openings being misaligned in the limited folded position of said links so that a force is required to complete the insertion of the pintles through the openings in the assembly of said links.

2. The combination according to claim 1 wherein the outer end of each of said lugs disposed away from said plates is beveled, said beveled outer ends of said lugs entering said keyway openings in the limited folded position of said links so that said links may be forced apart of disassembly.

3. The combination according to claim 2 wherein said inner ends of said pintles butt against each other when said links are assembled.

4. The combination according to claim 3 wherein said inner ends of said pintles are beveled.

5. The combination according to claim 4 wherein said lugs have inner ends extending to the ends of said pintles, the inner ends of said lugs being beveled.

6. The combination according to claim 5 wherein said lugs are semicircular in section and said keyway openings are semicircular to receive said lugs therethrough.

* * * * *